United States Patent  
Sakamoto et al.

(10) Patent No.: US 11,407,120 B2
(45) Date of Patent: Aug. 9, 2022

(54) CONTROL DEVICE, AND CONTROL METHOD

(71) Applicant: SONY CORPORATION, Tokyo (JP)

(72) Inventors: Atsushi Sakamoto, Kanagawa (JP); Yasunori Kawanami, Tokyo (JP); Masaya Kinoshita, Saitama (JP)

(73) Assignee: SONY CORPORATION, Tokyo (JP)

( * ) Notice: Subject to any disclaimer, the term of this patent is extended or adjusted under 35 U.S.C. 154(b) by 358 days.

(21) Appl. No.: 16/497,168

(22) PCT Filed: Feb. 8, 2018

(86) PCT No.: PCT/JP2018/004432
§ 371 (c)(1),
(2) Date: Sep. 24, 2019

(87) PCT Pub. No.: WO2018/198480
PCT Pub. Date: Nov. 1, 2018

(65) Prior Publication Data
US 2020/0101620 A1   Apr. 2, 2020

(30) Foreign Application Priority Data

Apr. 28, 2017 (JP) .............................. JP2017-089482

(51) Int. Cl.
*B25J 13/00* (2006.01)
*B25J 13/08* (2006.01)
*B62D 57/032* (2006.01)

(52) U.S. Cl.
CPC .......... *B25J 13/085* (2013.01); *B62D 57/032* (2013.01)

(58) Field of Classification Search
USPC ................................................. 700/245–264
See application file for complete search history.

(56) References Cited

U.S. PATENT DOCUMENTS 4,265,326 A * 5/1981 Lauber ................. B62D 57/028
180/8.3
6,330,494 B1 * 12/2001 Yamamoto ............. B25J 9/1674
700/262
6,458,011 B1 * 10/2002 Inoue ....................... A63H 3/36
446/376

(Continued)

FOREIGN PATENT DOCUMENTS

JP    2003-266362 A    9/2003
JP    2014-018931 A    2/2014

(Continued)

OTHER PUBLICATIONS

International Search Report and Written Opinion of PCT Application No. PCT/JP2018/004432, dated Apr. 17, 2018, 07 pages of ISRWO.

*Primary Examiner* — Jonathan L Sample
(74) *Attorney, Agent, or Firm* — Chip Law Group

(57) ABSTRACT

To provide a control device and a control method enabled to more simply execute initialization of a force sensor included in a legged walking robot. Provided is a control device including: a leg control unit that controls at least one or more legs of a legged walking robot including a plurality of legs, and stores a force sensor provided in each of the legs in a predetermined space in which the force sensor provided in each of the legs is in a non-contact state; and an initialization execution unit that performs initialization of the force sensor provided in each of the legs.

12 Claims, 8 Drawing Sheets

(56) References Cited

U.S. PATENT DOCUMENTS

| | | | | |
|---|---|---|---|---|
| 6,463,356 | B1* | 10/2002 | Hattori | B62D 57/032 701/25 |
| 6,493,606 | B2* | 12/2002 | Saijo | G06N 3/008 901/1 |
| 6,567,724 | B2* | 5/2003 | Yamamoto | B25J 9/1674 700/262 |
| D512,086 | S* | 11/2005 | Dirks | D15/199 |
| 7,017,687 | B1* | 3/2006 | Jacobsen | B62D 57/028 280/5.2 |
| 7,442,107 | B1* | 10/2008 | Ueda | A63H 11/20 446/175 |
| 8,544,572 | B2* | 10/2013 | Furuta | B62D 57/00 701/124 |
| 9,308,648 | B2* | 4/2016 | Perkins | B62D 57/032 |
| 9,778,132 | B1* | 10/2017 | Urata | B25J 13/085 |
| 9,957,002 | B2* | 5/2018 | Klassen | B60F 3/0007 |
| 10,011,016 | B1* | 7/2018 | Rembisz | B25J 5/007 |
| 10,285,828 | B2* | 5/2019 | Herr | A61F 2/72 |
| 10,556,630 | B1* | 2/2020 | Bingham | B62D 37/00 |
| 10,807,246 | B2* | 10/2020 | Hong | B25J 5/007 |
| 2004/0128028 | A1* | 7/2004 | Miyamoto | G06N 3/008 700/247 |
| 2004/0162636 | A1* | 8/2004 | Hattori | B62D 57/032 318/568.11 |
| 2005/0055131 | A1* | 3/2005 | Mikami | B62D 57/02 318/568.12 |
| 2006/0033462 | A1* | 2/2006 | Moridaira | B25J 9/1674 318/568.12 |
| 2006/0243499 | A1* | 11/2006 | Hosoda | B62D 57/028 180/8.5 |
| 2007/0013506 | A1* | 1/2007 | Takenaka | B25J 13/085 340/500 |
| 2009/0105878 | A1* | 4/2009 | Nagasaka | B25J 13/084 700/245 |
| 2009/0200090 | A1* | 8/2009 | Takanishi | B25J 19/0004 901/1 |
| 2009/0289433 | A1* | 11/2009 | Asai | A61H 3/04 280/234 |
| 2013/0231822 | A1* | 9/2013 | Gouaillier | G06F 11/30 901/1 |
| 2014/0343728 | A1* | 11/2014 | Jun | B63C 11/52 901/1 |
| 2015/0041227 | A1* | 2/2015 | Jun | B62D 57/032 901/1 |
| 2017/0183047 | A1* | 6/2017 | Takagi | B25J 9/1664 |

FOREIGN PATENT DOCUMENTS

| | | |
|---|---|---|
| JP | 2015-112689 A | 6/2015 |
| JP | 2017-058337 A | 3/2017 |

* cited by examiner

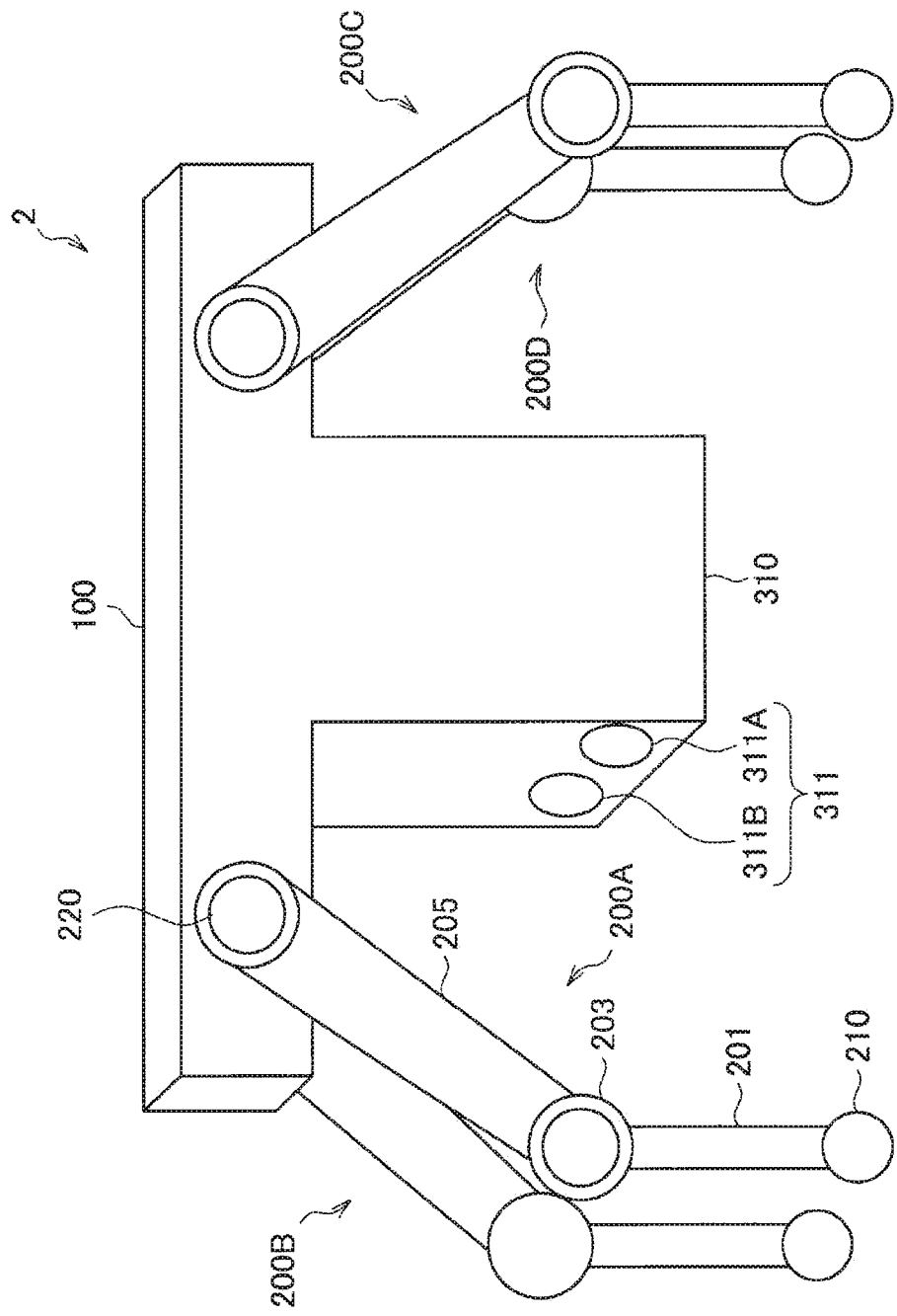

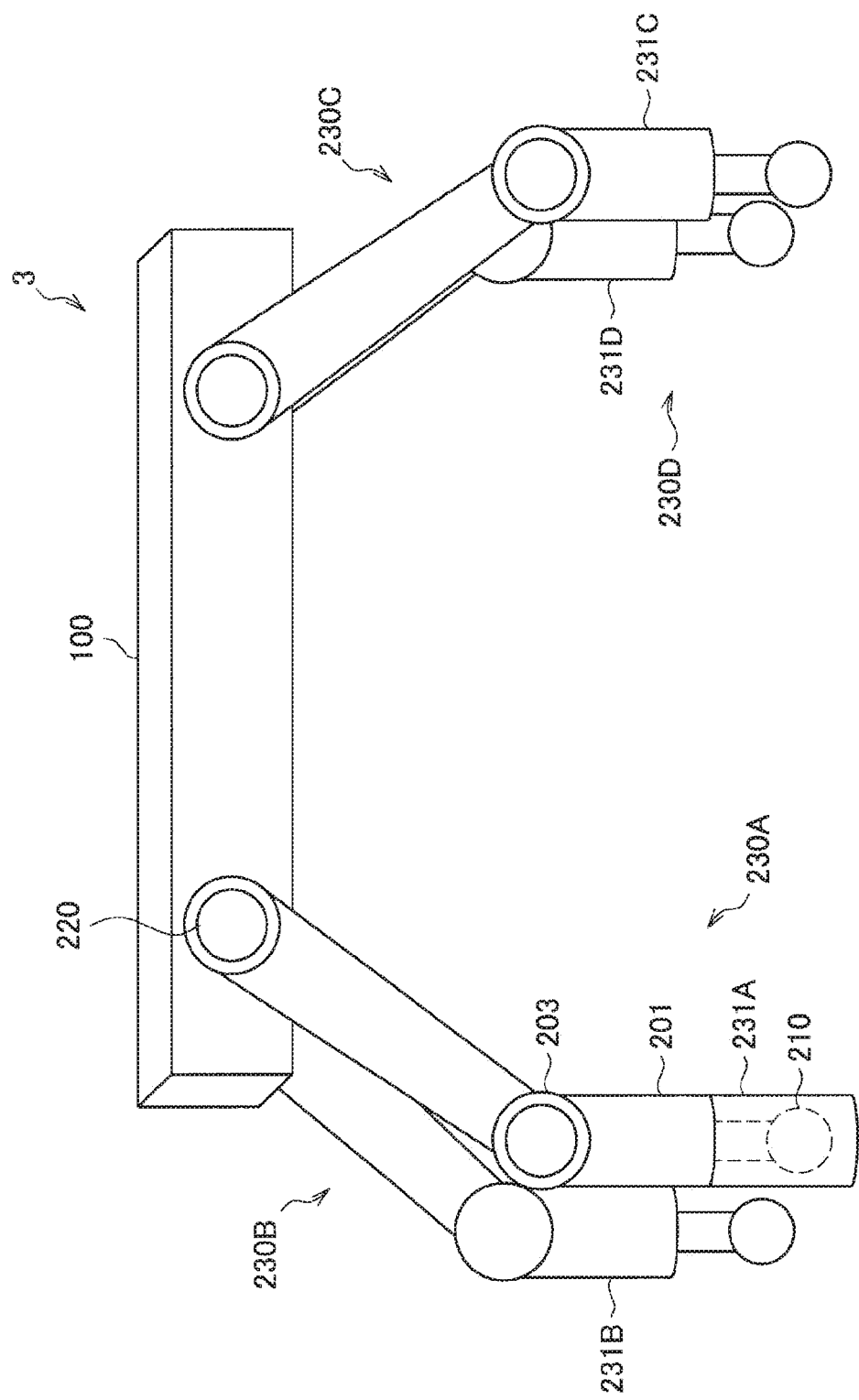

CONTROL DEVICE, AND CONTROL METHOD

CROSS REFERENCE TO RELATED APPLICATIONS

This application is a U.S. National Phase of International Patent Application No. PCT/JP2018/004432 filed on Feb. 8, 2018, which claims priority benefit of Japanese Patent Application No. JP 2017-089482 filed in the Japan Patent Office on Apr. 28, 2017. Each of the above-referenced applications is hereby incorporated herein by reference in its entirety.

TECHNICAL FIELD

The present disclosure relates to a control device, and a control method.

BACKGROUND ART

In recent years, robots have increased the number of places active in public facilities, living spaces, or the like as well as in production sites or the like such as factories. Therefore, for example, development of various robots has been promoted such as a robot hand device enabled to grip various objects, and a legged walking robot capable of advancing unpaved irregular ground or the like.

In controlling such a robot, not only a sensor for detecting a position of each part of the robot but also a sensor for detecting a sense of touch or a force sense (hereinafter collectively referred to as a force sensor) may be used as described in Patent Document 1 below. However, in the force sensor, its output may change due to aging. For example, in the force sensor, there is a possibility that abnormality occurs due to aging, such as: short abnormality in which a certain output is detected even in a case where there is no contact with an object, and it is determined as "contact"; or open abnormality in which an output is not detected in a case where there is contact with an object, and it is determined as "non-contact".

For example, Patent Document 1 below discloses that, in a sensor for detecting a sense of touch or a force sense included in a robot hand, to determine the open abnormality, an electrode for determining presence or absence of contact is further included in the robot hand.

On the other hand, legs of the legged walking robot are usually in contact with the ground. Therefore, in a case where the above-described force sensor is used to control the legged walking robot, it is important to detect and correct the short abnormality in which a certain output is detected even in a case where there is no contact with an object, in the force sensor included in the leg of the legged walking robot.

For example, in the legged walking robot, the legged walking robot is hung in the air by using a dedicated hanging tool, and the force sensor is caused to be not in contact with the ground, whereby correction (also referred to as initialization) is performed of the force sensor included in each leg of the legged walking robot to a state where there is no influence of the short abnormality.

CITATION LIST

Patent Document

Patent Document 1: Japanese Patent Application Laid-Open No. 2014-18931

SUMMARY OF THE INVENTION

Problems to be Solved by the Invention

However, the legged walking robot can move freely. Thus, depending on the situation, in the legged walking robot, it is required to execute initialization of the force sensor even in a case where there is no dedicated hanging tool.

In the present disclosure, a control device or control method is devised that is enabled more simply to execute initialization of the force sensor included in the legged walking robot.

Solutions to Problems

According to the present disclosure, a control device is provided including: a leg control unit that controls at least one or more legs of a legged walking robot including a plurality of legs, and stores a force sensor provided in each of the legs in a predetermined space in which the force sensor provided in each of the legs is in a non-contact state; and an initialization execution unit that performs initialization of the force sensor provided in each of the legs.

Furthermore, according to the present disclosure, a control method is provided including, by an arithmetic processing device, controlling at least one or more legs of a legged walking robot including a plurality of legs, and storing a force sensor provided in each of the legs in a predetermined space in which the force sensor provided in each of the legs is in a non-contact state, and performing initialization of the force sensor provided in each of the legs.

According to the present disclosure, initialization can be executed of a force sensor included in a legged walking robot by the legged walking robot alone without using a hanging tool or the like.

Effects of the Invention

As described above, according to the present disclosure, initialization can be more simply executed of the force sensor included in the legged walking robot.

Note that, the above-described effect is not necessarily limited, and in addition to the above-described effect, or in place of the above-described effect, any of effects described in the present specification, or other effects that can be grasped from the present specification may be exhibited.

BRIEF DESCRIPTION OF DRAWINGS

FIG. 4A is a schematic diagram illustrating a second control example by the leg control unit.

FIG. 5 is a schematic diagram illustrating a third control example by the leg control unit.

MODE FOR CARRYING OUT THE INVENTION

Preferred embodiments of the present disclosure will be described in detail below with reference to the accompanying drawings. Note that, in the present specification and the drawings, constituents having substantially the same functional configuration are denoted by the same reference signs, and redundant explanations will be omitted.

Note that, the description will be made in the following order.
1. Appearance example of legged walking robot
2. Configuration example of control device
3. Example of control method by control device
4. Supplementary note <1. Appearance Example of Legged Walking Robot>

Figure 1:
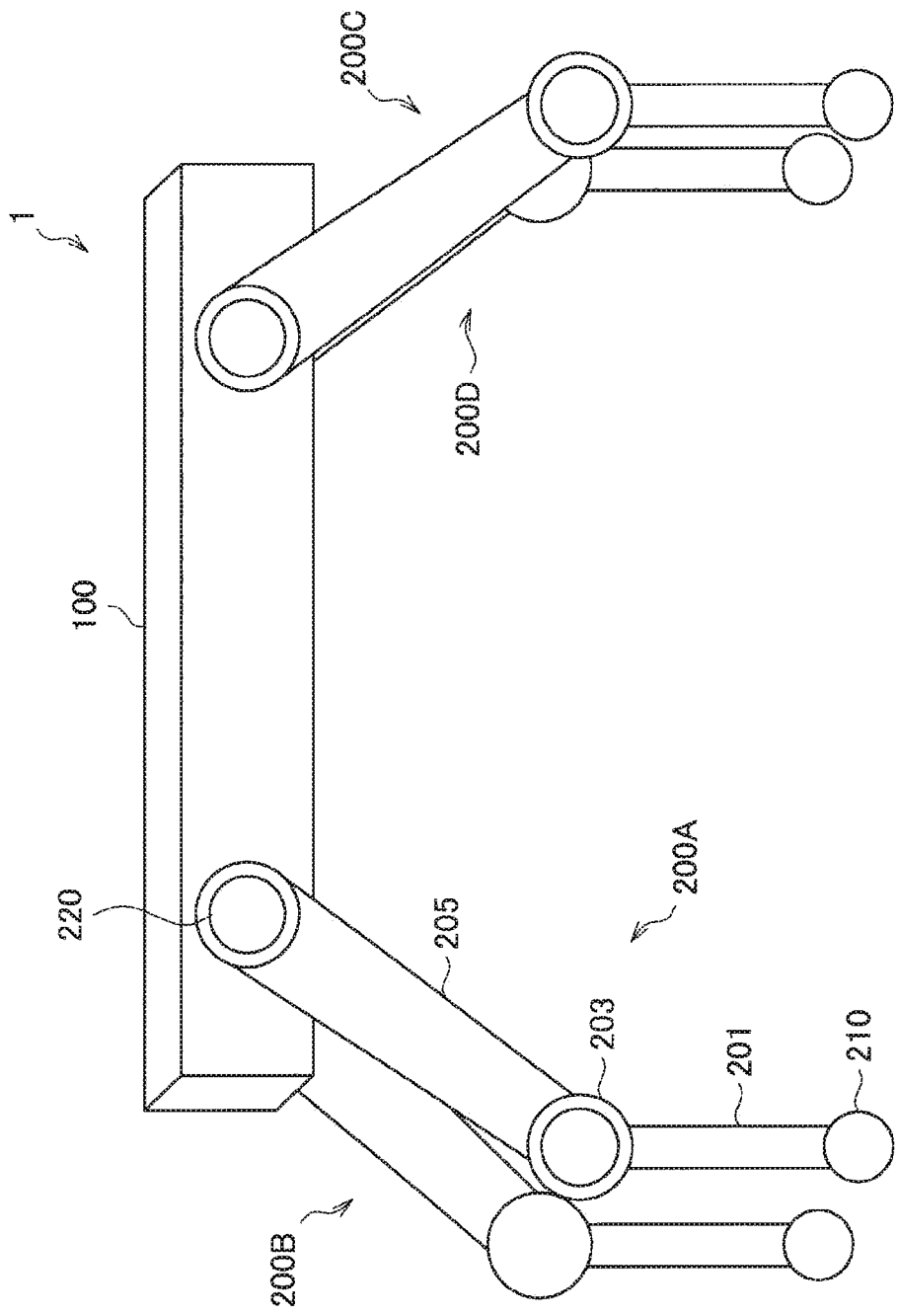
FIG. 1 is a schematic diagram illustrating an appearance example of a legged walking robot to which a technology according to the present disclosure can be applied.

First, with reference to FIG. 1, a legged walking robot will be described to which a technology according to the present disclosure can be applied. FIG. 1 is a schematic diagram illustrating an appearance example of a legged walking robot 1 to which the technology according to the present disclosure can be applied.

As illustrated in FIG. 1, the legged walking robot 1 to which the technology according to the present disclosure can be applied includes a main body 100, a plurality of legs 200A, 200B, 200C, and 200D (hereinafter, in a case where these are not distinguished from each other, also referred to collectively as a leg 200). As an example of the legged walking robot, FIG. 1 illustrates an appearance example of a four-legged walking robot including the four legs 200.

The main body 100 includes a housing to which the plurality of legs 200 is attached, and controls driving of the plurality of legs 200. Specifically, the main body 100 includes a drive motor that drives the plurality of legs 200, a control device that controls driving of the plurality of legs 200, and the like.

The drive motor included in the main body 100 may be anything as long as it can generate power. For example, the drive motor included in the main body 100 may be an electric motor that converts electrical energy into rotational motion, a cylinder that reciprocates by pressure, or the like.

The control device included in the main body 100 enables walking of the legged walking robot 1 by controlling driving of each of the legs 200 cooperatively on the basis of various types of information acquired by various sensors included in each of the legs 200. For example, the control device included in the main body 100 may control driving of each of the legs 200 on the basis of an output signal from a force sensor provided on a ground contact part 210 of each of the legs 200.

The plurality of legs 200 is attached to the main body 100 and supports the main body 100. Specifically, the legs 200 cause the legged walking robot to walk by being bent or expanded and contracted by driving of the drive motor included in the main body 100, or by driving of a drive motor incorporated in each joint.

The leg 200 may have any structure as long as the mass of the main body 100 can be supported, and for example, the leg 200 may have a multi-joint structure in which at least one or more joints and a link rotatably coupled to the joints are connected together. Furthermore, structures of the legs 200 included in the legged walking robot 1 may be the same structures or a combination of different structures.

The number of the legs 200 may be at least two or more to enable walking of the legged walking robot 1, and the upper limit is not particularly limited. However, to support the legged walking robot 1 stably, the number of the legs 200 is preferably three or more. Furthermore, to cause the legged walking robot 1 to walk stably, the number of the legs 200 is more preferably four or more.

Specifically, as illustrated in FIG. 1, the leg 200 may include a main body mounting part 220, a second link 205, a joint 203, a first link 201, and a ground contact part 210.

The main body mounting part 220 rotatably couples the second link 205 to the main body 100. Specifically, the main body mounting part 220 may be coupled to one end side of the second link 205, and may rotate the second link 205 with an axis perpendicular to the extending direction of the second link 205 as a rotation axis. For example, the main body mounting part 220 may make the second link 205 rotatable with the pitch axis of the legged walking robot 1 as a rotation axis. Note that, a rotatable range of the main body mounting part 220 is not particularly limited.

The second link 205 is coupled to the main body 100 via the main body mounting part 220, at one end side, and is rotatably provided to the main body 100 with the main body mounting part 220 as an axis part. The second link 205 is coupled at the other end side to one end side of the first link 201 via the joint 203, and is rotatably provided to the first link 201 with the joint 203 as an axis part.

The joint 203 rotatably couples the first link 201 to the second link 205. Specifically, the joint 203 may be coupled to one end side of the first link 201, and may rotate the first link 201 with an axis perpendicular to the extending direction of the first link 201 as a rotation axis. For example, the joint 203 may make the first link 201 rotatable with the pitch axis of the legged walking robot 1 as a rotation axis. Note that, a rotatable range of the joint 203 is not particularly limited.

The first link 201 is coupled to the other end side of the second link 205 via the joint 203, at one end side, and is rotatably provided to the second link 205 with the joint 203 as an axis part. At the other end side of the first link 201, the ground contact part 210 is provided that comes in contact with the ground or the like.

The ground contact part 210 is a part that is provided at the tip side of the leg 200 and comes in contact with the ground. Specifically, the ground contact part 210 may include the force sensor that detects contact between the leg 200 and the ground, and may further include, for example, a cover, a shock absorber, or the like, for protecting the leg 200 from the ground or the like. Note that, in the present specification, the force sensor refers to a sensor enabled to detect contact with an object, and may include a contact-sensitive sensor, a pressure-sensitive sensor, and the like in addition to the force sensor. The force sensor may be provided anywhere in the leg 200 as long as contact between the leg 200 and the ground can be detected. In other words, the force sensor does not have to be included in the ground contact part 210, and does not have to be in contact with the ground. However, to more reliably detect contact between the leg 200 and the ground, the force sensor is preferably included in the ground contact part 210 on the tip side of the leg 200 and in contact with the ground.

Here, the force sensor included in the ground contact part 210 detects whether or not each of the legs 200 is in contact with the ground, thereby contributing walking control of the legged walking robot 1 by the control device included in the main body 100. However, in the force sensor, short abnormality may occur in which a certain output is detected even in a case where there is no contact with an object due to aged deterioration or the like. Therefore, in the force sensor included in the legged walking robot 1, the influence of the short abnormality is corrected by applying a certain offset to the output signal. In the present specification, setting an offset value to the output signal for the force sensor is also referred to, for example, as initialization of the force sensor.

To execute initialization of the force sensor, it is important to guarantee that the force sensor included in each of the legs 200 is in a non-contact state not in contact with the ground or the like. In view of such circumstances, the present inventors have conceived of a control device and a control method according to an embodiment of the present disclosure. The control device and the control method according to the embodiment of the present disclosure are enabled to simply perform initialization of the force sensor included in the legged walking robot 1. Hereinafter, the control device according to the present embodiment will be specifically described.

<2. Configuration Example of Control Device>

Figure 2:
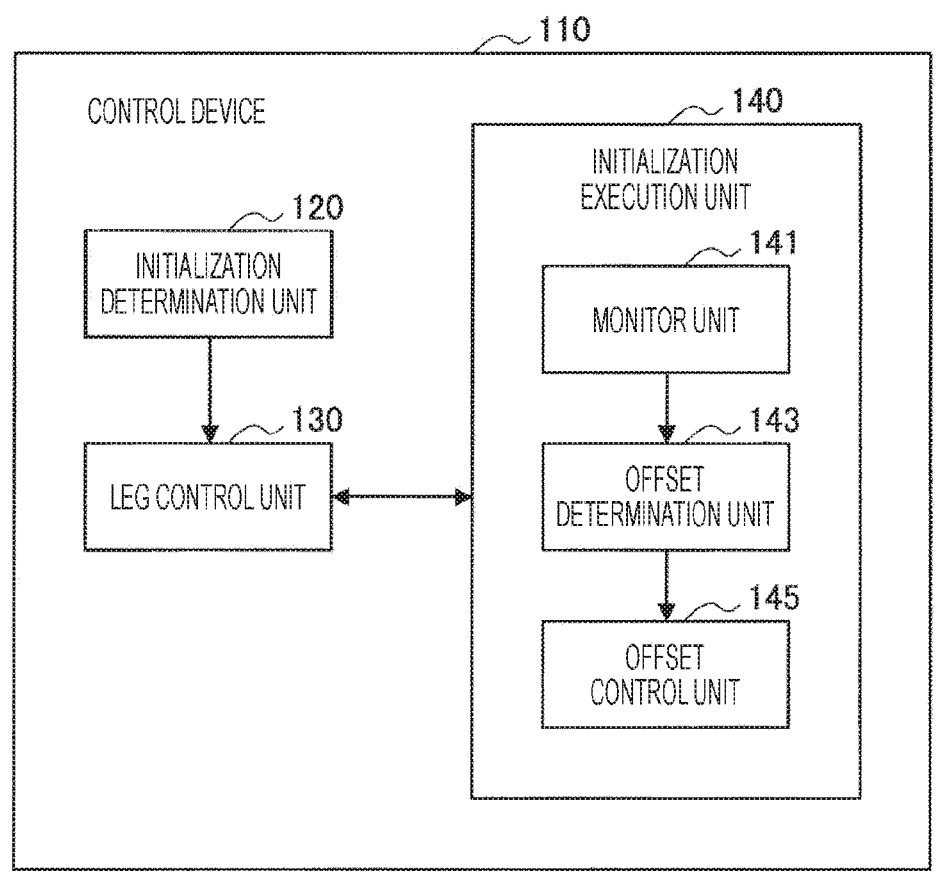
FIG. 2 is a block diagram illustrating a configuration example of a control device according to an embodiment of the present disclosure.

First, with reference to FIG. 2, a configuration example will be described of the control device according to the embodiment of the present disclosure. FIG. 2 is a block diagram illustrating a configuration example of a control device 110 according to the embodiment of the present disclosure. Note that, the control device 110 according to the present embodiment can be included, for example, in the main body 100 of the legged walking robot 1 described above.

As illustrated in FIG. 2, the control device 110 includes an initialization determination unit 120, a leg control unit 130, and an initialization execution unit 140.

The initialization determination unit 120 determines whether or not to execute initialization of the force sensor included in each of the legs 200 of the legged walking robot 1. Specifically, in a case where it is determined that a certain output is detected (in other words, short abnormality has occurred) in any of the force sensors included in the respective legs 200 even in a non-contact state not in contact with an object, the initialization determination unit 120 determines to execute initialization of the force sensor. Note that, the initialization determination unit 120 may determine to initialize all the force sensors included in the respective legs 200, or may determine to initialize part of the force sensors included in the respective legs 200.

For example, the initialization determination unit 120 may determine to initialize the force sensor included in each of the legs 200 on the basis of an instruction from a user. The initialization determination unit 120 may determine to initialize the force sensor included in each of the legs 200 for each timing immediately after the activation or immediately before the shutdown of the legged walking robot 1.

For example, the initialization determination unit 120 may determine to initialize the force sensor included in each of the legs 200 in a case where the operating time or the number of activations of the legged walking robot 1 exceeds a threshold value. The initialization determination unit 120 may determine to initialize the force sensor included in each of the legs 200 in a case where abnormality of the force sensor is determined on the basis of an average value or a change width of outputs of the force sensor.

At this time, the initialization determination unit 120 may instruct the leg control unit 130 and the initialization execution unit 140 to initialize the force sensor immediately after determining initialization of the force sensor. Alternatively, the initialization determination unit 120 may instruct the leg control unit 130 and the initialization execution unit 140 to initialize the force sensor at a predetermined timing (for example, after activation of the legged walking robot 1) after determining initialization of the force sensor.

The leg control unit 130 controls each of the legs 200 so that the force sensor included in each of the legs 200 is in the non-contact state not in contact with an object. Specifically, the leg control unit 130 stores the force sensor in a predetermined space (hereinafter, also referred to a non-contact guarantee space) in which it is guaranteed that the force sensor is in the non-contact state not in contact with an object by being surrounded by a structural member constituting the legged walking robot 1. Control by the leg control unit 130 and a specific example of the non-contact guarantee space will be described later with reference to FIGS. 3, 4A, 4B, and 5.

After the force sensor included in the leg 200 is stored in the non-contact guarantee space by the control of the leg control unit 130, the initialization execution unit 140 initializes the force sensor. As described above, initialization of the force sensor represents setting an offset value for the output signal from the force sensor that has changed due to a change over time.

Specifically, the initialization execution unit 140 includes a monitor unit 141, an offset determination unit 143, and an offset control unit 145, and initializes the force sensor with these units. However, a specific method of initialization by the initialization execution unit 140 is not limited to the following. The initialization execution unit 140 may initialize the force sensor by another method as long as precision and accuracy can be improved of the output signal of the force sensor. Furthermore, the initialization execution unit 140 may perform correction or calibration of the output signal for the force sensor.

The monitor unit 141 measures the output signal from the force sensor for a predetermined time. Specifically, the monitor unit 141 measures, for the predetermined time (for example, about one minute or several minutes), the output signal from the force sensor in the non-contact state by being stored in the non-contact guarantee space. At this time, since the force sensor is in the non-contact state not in contact with an object, the measured output signal from the force sensor corresponds to a background signal of the output signal obtained from the force sensor.

The offset determination unit 143 determines an offset value for the output signal of the force sensor on the basis of a measurement result from the monitor unit 141. For example, the offset determination unit 143 may determine, as a new offset value of the force sensor, an average value of the output signals of the force sensor in the predetermined time measured by the monitor unit 141. Alternatively, the offset determination unit 143 may determine, as a new offset value of the force sensor, the lowest value of the output signal of the force sensor in the predetermined time. Moreover, the offset determination unit 143 may determine, as a new offset value of the force sensor, an intermediate value between the highest value and the lowest value of the output signal of the force sensor in the predetermined time.

The offset control unit 145 sets, at the offset value determined by the offset determination unit 143, an offset value of the force sensor. Specifically, the offset control unit 145 stores the offset value determined by the offset determination unit 143 in a memory provided in a control circuit of the legged walking robot 1. In a case where the offset value of the force sensor is already stored in the memory, the offset control unit 145 updates the stored offset value with the offset value determined by the offset determination unit 143.

As a result, initialization is completed of the force sensor by the initialization execution unit 140. Thereafter, the leg control unit 130 controls a posture or a state of the leg 200 so that each of the legs 200 is controlled and the force sensor is taken out from the non-contact guarantee space, and the legged walking robot 1 is enabled to walk.

Note that, the control device 110 described above may be implemented by, for example, cooperation between hardware such as a central processing unit (CPU) or a micro processing unit (MPU), a random access memory (RAM), and a read only memory (ROM), and software that controls operation of each component.

The CPU or MPU functions as an arithmetic processing device, and executes a whole of information processing and information calculation in the control device 110 in accordance with various programs stored in the ROM or the like. The ROM stores programs used by the CPU and calculation parameters, and the RAM temporarily stores the programs used in execution of the CPU and parameters and the like appropriately changed in the execution. The CPU, the ROM, and the RAM are connected to each other by, for example, an internal bus, a bridge, or the like.

Figure 3:
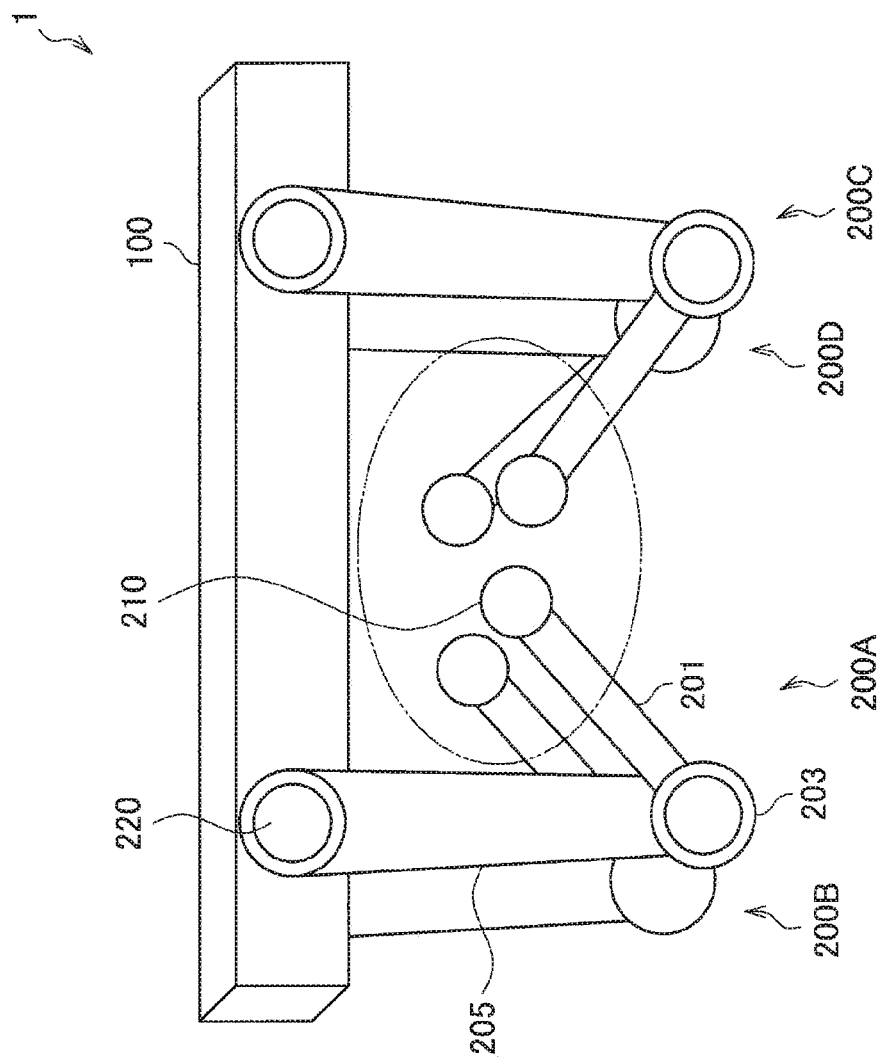
FIG. 3 is a schematic diagram illustrating a first control example by a leg control unit.
Figure 4B:
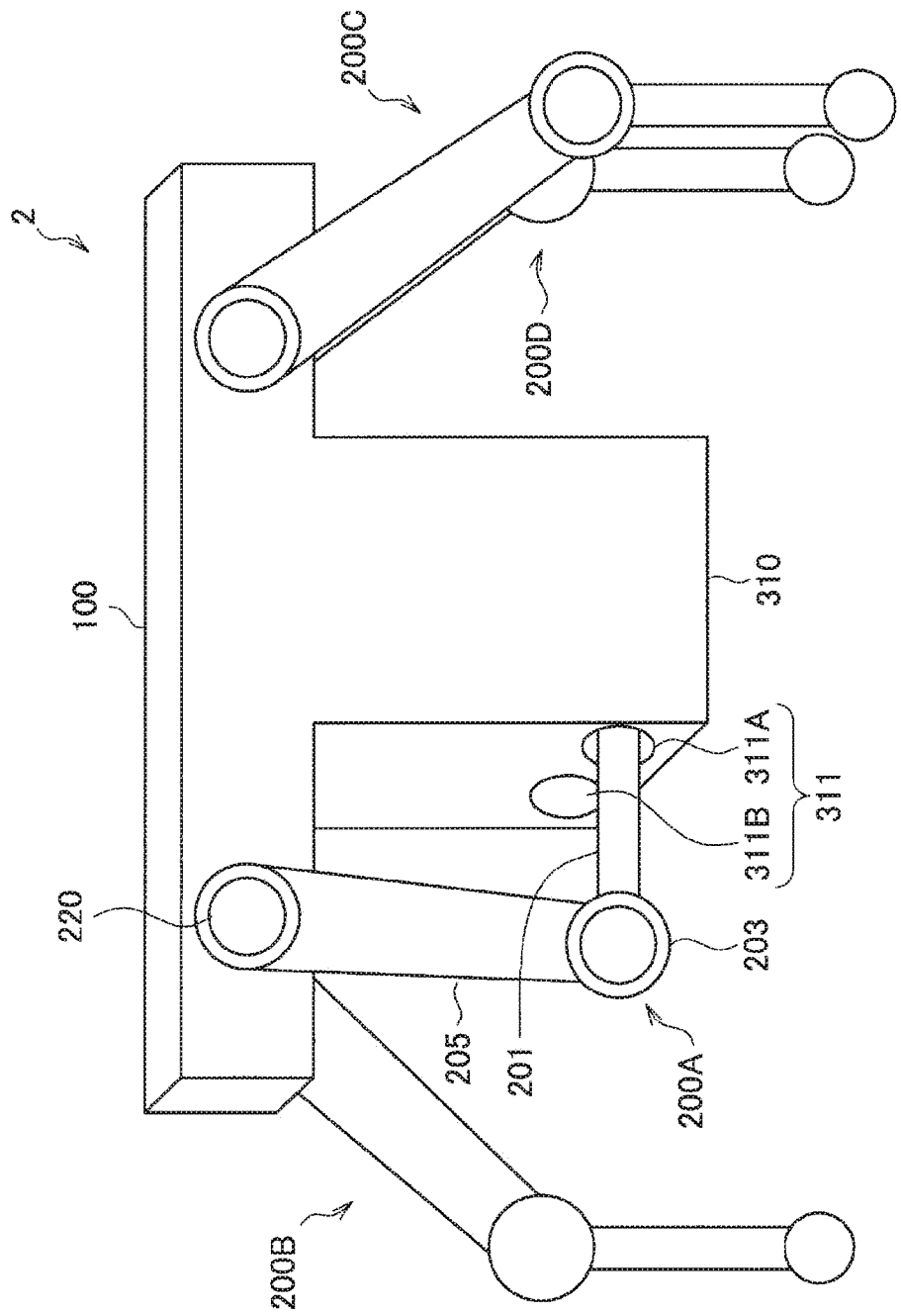
FIG. 4B is a schematic diagram illustrating the second control example by the leg control unit.

Here, with reference to FIGS. 3, 4A, 4B, and 5, description will be made more specifically for the non-contact guarantee space, and the control of each of the legs 200 by the leg control unit 130. FIG. 3 is a schematic diagram illustrating a first control example by the leg control unit 130. FIGS. 4A and 4B are schematic diagrams illustrating a second control example by the leg control unit 130. FIG. 5 is a schematic diagram illustrating a third control example by the leg control unit 130.

(First Control Example)

As illustrated in FIG. 3, in the first control example, the leg 200 rotates the first link 201 at the joint 203, whereby the ground contact part 210 including the force sensor is stored in a non-contact guarantee space 300 existing below the main body 100.

Specifically, in the first control example, the non-contact guarantee space 300 is a substantially rectangular solid shaped space including one surface facing the ground of the main body 100 as the upper surface, a surface surrounded by the legs 200A, 200B, 200C, and 200D as the side surface, and the ground as the lower surface. Since the space is a space surrounded by the main body 100, and each of the second links 205 of the legs 200, there is a low possibility that an object from the outside enters, and it can be guaranteed that the force sensor stored inside is in the non-contact state.

In the first control example, the leg 200 rotates the first link 201 so that an angle formed by the first link 201 and the second link 205 connected to the joint 203 becomes smaller, whereby the ground contact part 210 at an end of the first link 201 can be stored in the non-contact guarantee space 300. Note that, to store the ground contact part 210 provided at the end in the non-contact guarantee space 300 existing below the main body 100, the leg 200 is only required to include at least one or more joints 203 having the pitch axis of the legged walking robot 1 as a rotation axis. For example, while balancing by each of the legs 200, the legged walking robot 1 bends the first link 201 inward at the same time around the joint 203, whereby the ground contact part 210 can be stored in the non-contact guarantee space 300.

Here, in a case where the legs 200 have the same structure as each other, the joints 203 of the respective legs 200 come in contact with the ground, whereby the legged walking robot 1 can be supported without losing its balance. Thus, in such a case, the legs 200 can respectively store the ground contact parts 210 each including the force sensor in the non-contact guarantee space 300 without causing the legged walking robot 1 to fall down.

Note that, in a case where the legged walking robot 1 is a four-legged walking robot, the legged walking robot 1 can stand stably with the three legs 200, so that the force sensor included in any one of the legs 200 can be initialized even during walking.

Thus, according to the first control example, even if the legged walking robot 1 is not hung in the air, the force sensor included in each of the legs 200 can be brought into the non-contact state, so that the force sensor can be initialized more easily.

(Second Control Example)

As illustrated in FIGS. 4A and 4B, in the second control example, a legged walking robot 2 includes a storage member 310 including a non-contact guarantee space inside, and the leg 200 stores the force sensor in the non-contact guarantee space by inserting the ground contact part 210 including the force sensor into a storage hole 311.

Specifically, in the second control example, the non-contact guarantee space is a space provided inside the storage member 310 that is hollow. Since the space is a space surrounded by a housing of the storage member 310, no object from the outside enters. Thus, the leg 200 can guarantee that the force sensor is in the non-contact state by inserting the ground contact part 210 including the force sensor into the inside of the storage member 310 via the storage hole 311.

As illustrated in FIG. 4A, the storage member 310 may include, for example, storage holes 311A, 311B, 311C (not illustrated), and 311D (not illustrated) for the legs 200A, 200B, 200C, and 200D, respectively. Alternatively, the storage member 310 may include, for example, one storage hole having an opening large enough into which all of the legs 200A, 200B, 200C, and 200D can be inserted.

As illustrated in FIG. 4B, in the second control example, the leg 200 rotates the main body mounting part 220 and the joint 203, and inserts the first link 201 into the storage hole 311, whereby the ground contact part 210 including the force sensor can be inserted into the inside of the storage member 310. As a result, the ground contact part 210 including the force sensor can be stored in the non-contact guarantee space provided inside the storage member 310. For example, the leg 200A may insert the first link 201 into the storage hole 311A provided in the storage member 310. Furthermore, similarly, the first link 201 may be inserted into the storage holes 311B, 311C (not illustrated), and 311D (not illustrated) for the legs 200B, 200C, and 200D, respectively.

Here, as illustrated in FIG. 4B, the legged walking robot 2 may store only the ground contact part 210 including the force sensor to be initialized in the storage member 310, and initialize only the stored force sensor. In a case where the legged walking robot 2 is a four-legged walking robot, the legged walking robot 2 can stand stably with the three legs 200, so that the force sensor included in any one of the legs 200 can be initialized even during walking. Alternatively, the legged walking robot 2 may temporarily stop, and store the ground contact parts 210 of all the legs 200 in the storage member 310, and then initialize the force sensors included in all the ground contact parts 210.

Thus, according to the second control example, even if the legged walking robot 2 is not hung in the air, the force sensor can be brought into the non-contact state by the storage member 310 provided in the main body 100, so that the force sensor can be initialized more easily. In the second control example, since the non-contact guarantee space is separated from the outside by the housing of the storage member 310, the non-contact guarantee space can guarantee more reliably that the stored force sensor is in the non-contact state.

(Third Control Example)

As illustrated in FIG. 5, in the third control example, legs 230A, 230B, 230C, and 230D (hereinafter, in a case where these are not distinguished from each other, also referred to as a leg 230) of a legged walking robot 3 respectively include exterior parts 231A, 231B, 231C, and 231D (hereinafter, in a case where these are not distinguished from each other, also referred to as an exterior part 231) provided to cover the side surfaces of the exterior parts 230A, 230B, 230C, and 230D. The leg 230 extends the exterior part 231 toward the tip side of the leg 230 and supports the leg 230 with the exterior part 231, thereby storing the ground contact part 210 including the force sensor in the non-contact guarantee space.

Specifically, in the third control example, the non-contact guarantee space is an internal space covered by the exterior part 231. Since the space is a space covered by the exterior part 231, an object from the outside does not enter. Thus, the leg 230 can guarantee that the force sensor is in the non-contact state by extending the exterior part 231 toward the tip side of the leg 230. Note that, needless to say, at this time, the ground contact part 210 including the force sensor is not in contact with the ground.

The exterior part 231 is provided to be able to extend and contract along the extending direction of the first link 201. The leg 230 causes the exterior part 231 to come in contact with the ground by extending the exterior part 231 toward the tip side of the leg 230, and causes the exterior part 231 to support the mass of the main body 100. As a result, the ground contact part 210 does not come in contact with the ground, and is stored in the internal space covered by the exterior part 231. Thus, the leg 230 can guarantee that the force sensor is in the non-contact state, by pulling the ground contact part 210 into the internal space covered by the exterior part 231 so that the ground contact part 210 including the force sensor does not come in contact with the ground.

The legged walking robot 3 may extend only the exterior part 231 of the leg 230 including the force sensor to be initialized, thereby initializing only the stored force sensor. Alternatively, the legged walking robot 3 may extend the exterior parts 231 of all the legs 230 to store the force sensors of all the legs 230 in the non-contact guarantee space, thereby initializing the stored force sensors.

In the legged walking robot 3, the extended exterior part 231 comes in contact with the ground, whereby the mass of the legged walking robot 3 is supported by the exterior part 231. Thus, the legged walking robot 3 can initialize the force sensor included in the leg 230 even while walking. Thus, according to the third control example, even if the legged walking robot 3 is not hung in the air, the force sensor included in each of the legs 230 can be brought into the non-contact state, so that the force sensor can be initialized more easily.

<3. Example of Control Method by Control Device>

Figure 6:
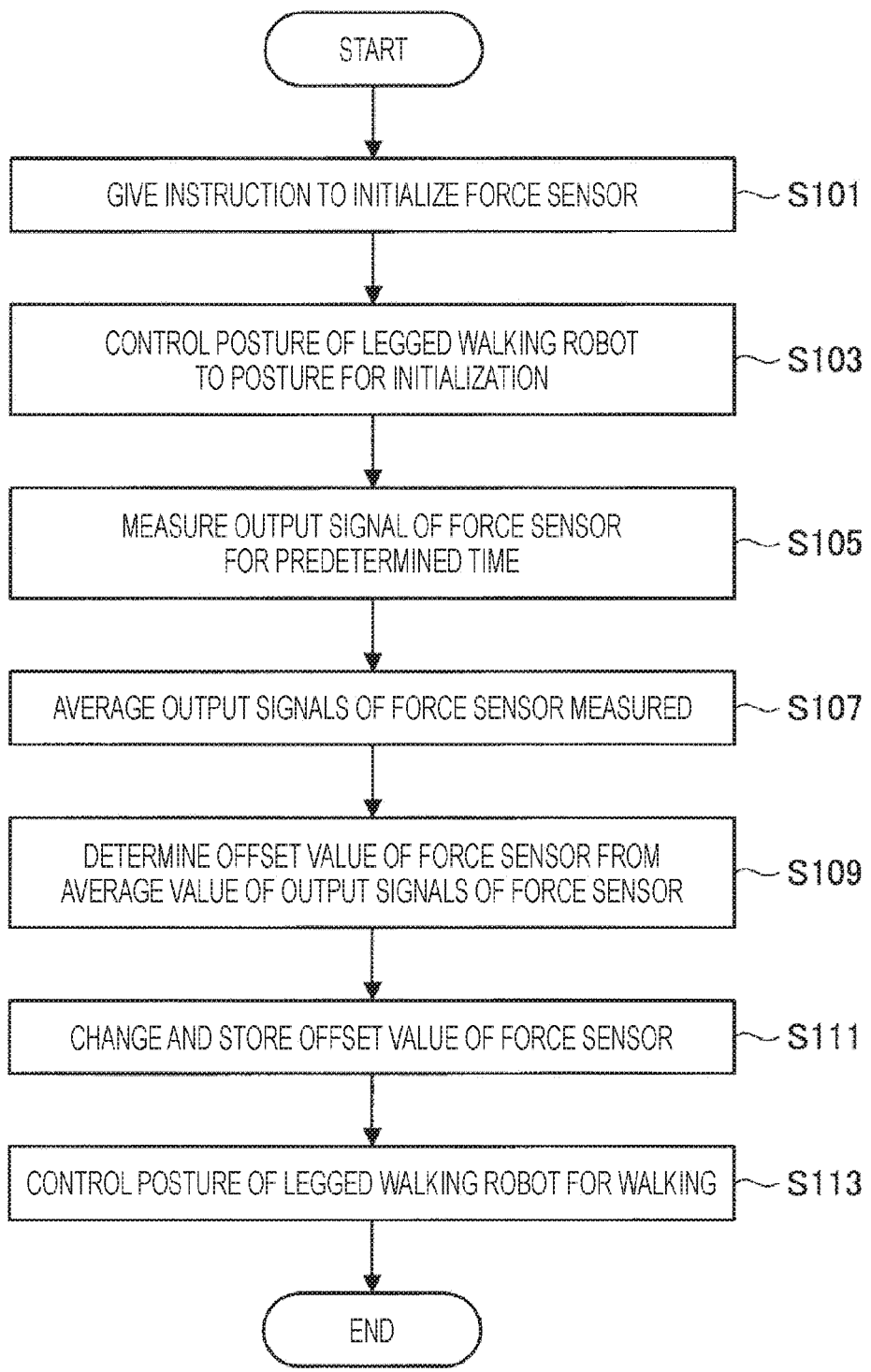
FIG. 6 is a flowchart illustrating a first operation example of the control device.
Figure 7:
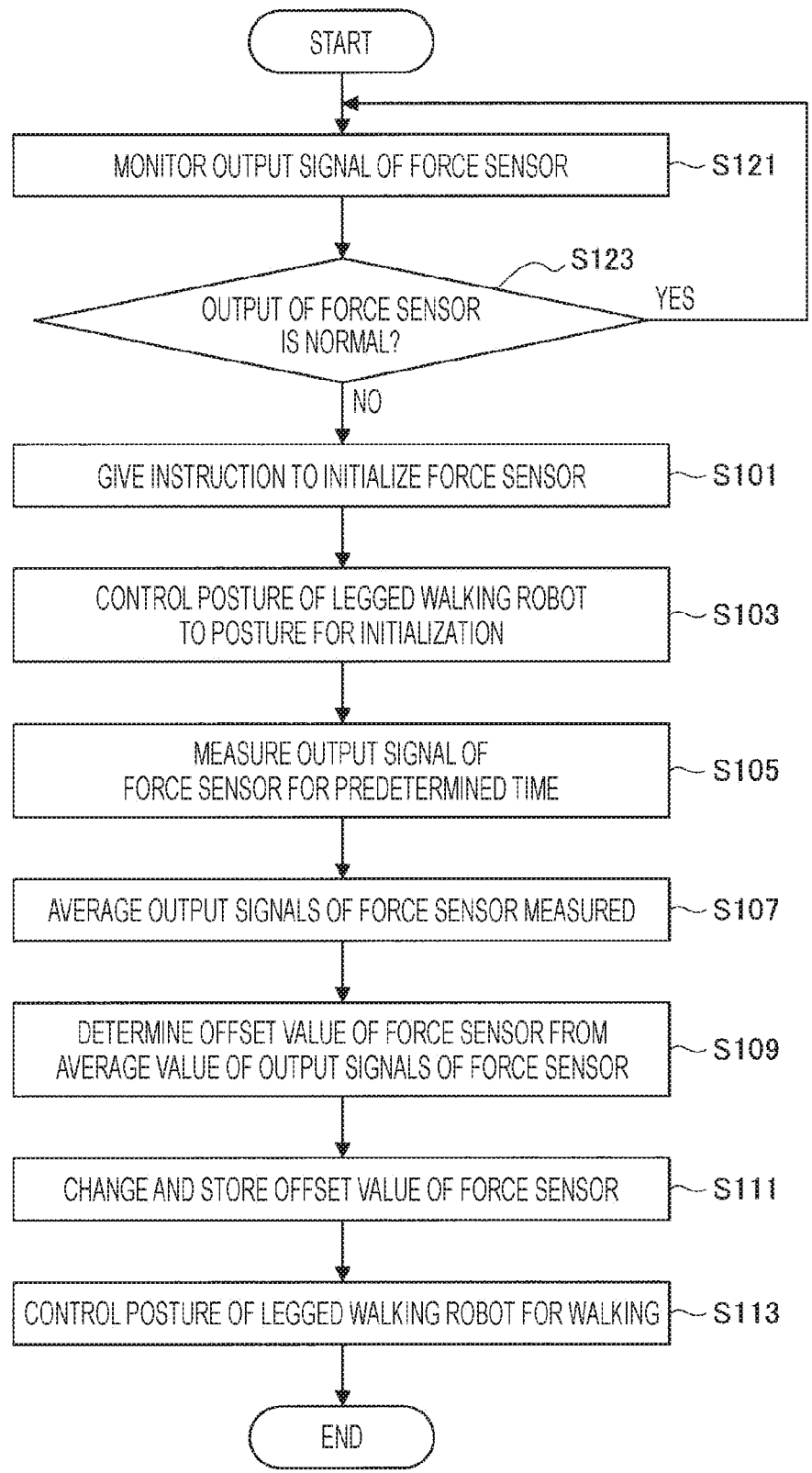
FIG. 7 is a flowchart illustrating a second operation example of the control device.

Subsequently, with reference to FIGS. 6 and 7, operation examples will be described that are executed by the control device 110 according to the present embodiment. FIG. 6 is a flowchart illustrating a first operation example of the control device 110. FIG. 7 is a flowchart illustrating a second operation example of the control device 110.

(First Operation Example)

First, the first operation example of the control device 110 will be described with reference to FIG. 6. The first operation example is an operation example in a case where initialization of the force sensor is executed at a predetermined timing such as immediately after activation of the legged walking robot 1, or by an instruction from the user. In the first operation example, the legged walking robot 1 may initialize all the force sensors included in the legs 200 simultaneously.

As illustrated in FIG. 6, first, an instruction is given to initialize the force sensor by the initialization determination unit 120 (S101). For example, the initialization determination unit 120 may give an instruction to initialize the force sensor for each activation of the legged walking robot 1, may give an instruction to initialize the force sensor in a case where the operating time of the legged walking robot 1 exceeds the threshold value, or may give an instruction to initialize the force sensor in a case where there is an input to initialize the force sensor from the user.

Next, the leg control unit 130 controls each of the legs 200 of the legged walking robot 1 so that the force sensor included in the leg 200 is stored in the non-contact guarantee space (S103). For example, the leg control unit 130 controls a posture of the legged walking robot 1 to a posture for initialization of the force sensor so that the force sensor included in each of the legs 200 is stored in the non-contact guarantee space. Subsequently, the monitor unit 141 acquires an output signal for a predetermined time from the force sensor stored in the non-contact guarantee space (S105). Next, the offset determination unit 143 averages output signals of the force sensor acquired for the predetermined time by the monitor unit 141 (S107), and determines an offset value of the force sensor from an average value of the output signals (S109). For example, the offset determination unit 143 may determine the average value of the output signals of the force sensor in the predetermined time as the offset value of the force sensor.

Moreover, the offset control unit 145 stores the offset value determined by the offset determination unit 143 in the memory of the control circuit of the legged walking robot 1, or the like (S111). Note that, in a case where the offset value is already stored in the memory, the offset control unit 145 may change the stored offset value to a new offset value determined by the offset determination unit 143. Thereafter, the leg control unit 130 controls each of the legs 200 so that the force sensor is taken out from the non-contact guarantee space and the legged walking robot 1 is enabled to walk (S111).

(Second Operation Example)

Next, the second operation example of the control device 110 will be described with reference to FIG. 7. The second operation example is an operation example in a case where initialization of the force sensor is executed during walking of the legged walking robot 1.

For example, in a case where the legged walking robot 1 includes four or more legs 200, the legged walking robot 1 can stand up stably as long as it is supported by at least three legs 200. Thus, even during walking, the legged walking robot 1 can store the force sensor included in one of the legs 200 in the non-contact guarantee space, and execute initialization of the force sensor. With this configuration, for example, in a case where abnormality is detected in the force sensor during walking, the legged walking robot 1 can initialize the force sensor in which the abnormality is detected during walking. Furthermore, such a legged walking robot 1 sequentially initializes the force sensors included in the respective legs 200 one by one, whereby it is also possible to initialize the force sensors included in the respective legs 200 while maintaining the walking or the standing up at any timing.

As illustrated in FIG. 7, the control circuit that controls driving of each of the legs 200 of the legged walking robot 1 monitors the output signal from each of the force sensors during walking of the legged walking robot 1, or the like (S121). Here, the control circuit that controls driving of each of the legs 200 determines whether or not the output signal of the force sensor is normal (S123). For example, the control circuit may determine that the force sensor is abnormal in a case where the output signal of the force sensor exceeds a threshold value for a predetermined time.

In a case where it is determined that the force sensor is normal by the control circuit that controls driving of each of the legs 200 (S123/Yes), the control circuit continues to monitor the output signal from each of the force sensors (S121). On the other hand, in a case where it is determined that the force sensor is abnormal by the control circuit that controls driving of each of the legs 200 (S123/No), an instruction is given to initialize the force sensor by the initialization determination unit 120 (S101).

Next, the leg control unit 130 controls the leg 200 including the force sensor to store the force sensor determined as being abnormal in the non-contact guarantee space (S103). Subsequently, the monitor unit 141 acquires an output signal for a predetermined time from the force sensor stored in the non-contact guarantee space (S105). Next, the offset determination unit 143 averages output signals of the force sensor acquired for the predetermined time by the monitor unit 141 (S107), and determines an offset value of the force sensor from an average value of the output signals (S109). For example, the offset determination unit 143 may determine the average value of the output signals of the force sensor in the predetermined time as the offset value of the force sensor.

Moreover, the offset control unit 145 stores the offset value determined by the offset determination unit 143 in the memory or the like (S111), and applies an offset to the output signal of the force sensor by using the offset value. Thereafter, the leg control unit 130 takes out the force sensor determined as being abnormal from the non-contact guarantee space, and controls the leg 200 so that the leg 200 is made to be in an original posture (S111).

Thus, according to the control device 110 according to the present embodiment, the force sensor included in each of the legs 200 of the legged walking robot 1 can be initialized with a simpler method without using a hanging tool or the like. Furthermore, the legged walking robot 1 to which the control device 110 according to the present embodiment is applied, can also initialize the force sensor in which abnormality is detected in the output signal, while walking.

<4. Supplementary Note>

In the above, the preferred embodiments of the present disclosure have been described in detail with reference to the accompanying drawings; however, the technical scope of the present disclosure is not limited to such examples. It is obvious that persons having ordinary knowledge in the technical field of the present disclosure can conceive various modification examples or correction examples within the scope of the technical idea described in the claims, and it is understood that the modification examples or correction examples also belong to the technical scope of the present disclosure.

For example, in the above embodiment, the legged walking robot 1 is exemplified as a device to which the control device 110 according to the present embodiment can be applied, but the present technology is not limited to such an example. For example, the control device 110 according to the present embodiment can also be applied to another mobile body including a force sensor or the like in the ground contact part 210.

Furthermore, for example, in the above embodiment, the force sensor is exemplified as a sensor initialized by the control device 110 according to the present embodiment, but the present technology is not limited to such an example. For example, it is possible to use a contact sensor, a pressure-sensitive sensor, or the like instead of the force sensor.

Furthermore, the effects described in the present specification are merely illustrative or exemplary and not restrictive. That is, the technology according to the present disclosure can exhibit other effects obvious to those skilled in the art from the description of the present specification together with the above-described effects or in place of the above-described effects.

Note that, the following configurations also belong to the technical scope of the present disclosure.

(1)

A control device including:

a leg control unit that controls at least one or more legs of a legged walking robot including a plurality of legs, and stores a force sensor provided in each of the legs in a predetermined space in which the force sensor provided in each of the legs is in a non-contact state; and an initialization execution unit that performs initialization of the force sensor provided in each of the legs.

(2)

The control device according to (1), in which the force sensor is provided at an end of a side in contact with the ground of each of the legs.

(3)

The control device according to (2), in which the legged walking robot includes a main body and three or more legs supporting the main body, and the predetermined space is provided at a side of one surface facing the ground of the main body, and is a space surrounded by the main body and the three or more legs.

(4)

The control device according to (3), in which each of the legs includes at least one or more joints and a plurality of links, and the leg control unit stores the force sensor in the predetermined space by bending each of the legs at the joints.

(5)

The control device according to (4), in which the one surface facing the ground of the main body is provided with a storage member including a space inside and enabled to store the end of each of the legs, and the leg control unit stores, in the storage member, the end of each of the legs in which the force sensor is provided.

(6)

The control device according to (2), in which each of the legs includes an exterior part that covers a side surface of each of the legs and is slidable along each of the legs, and the leg control unit stores the force sensor in the predetermined space provided inside the exterior part by sliding the exterior part to surround the force sensor.

(7)

The control device according to any one of (1) to (6), in which the initialization execution unit sets an offset value for an output signal from the force sensor.

(8)

The control device according to (7), in which
the initialization execution unit includes:
a monitor unit that measures an output signal of the force sensor in the non-contact state;
an offset determination unit that determines an offset value for the output signal of the force sensor on the basis of the output signal measured; and
an offset control unit that sets, at the offset value determined by the offset determination unit, an offset value of the force sensor.

(9)

The control device according to any one of (1) to (8), in which the initialization execution unit performs initialization of force sensors of all the legs included in the legged walking robot at a predetermined timing.

(10)

The control device according to any one of (1) to (8), in which, in a case where abnormality is detected in any of the force sensors, the initialization execution unit performs initialization of the force sensor in which the abnormality is detected.

(11)

The control device according to (10), in which the initialization execution unit performs initialization of the force sensor in which the abnormality is detected during walking of the legged walking robot.

(12)

The control device according to any one of (1) to (11), in which an output from the force sensor is used for walking control with the plurality of legs of the legged walking robot.

(13)

The control device according to any one of (1) to (12), in which the number of the legs included in the legged walking robot is four or more.

(14)

A control method including:
by an arithmetic processing device,
controlling at least one or more legs of a legged walking robot including a plurality of legs, and storing a force sensor provided in each of the legs in a predetermined space in which the force sensor provided in each of the legs is in a non-contact state; and
performing initialization of the force sensor provided in each of the legs.

REFERENCE SIGNS LIST 1, 2, 3 Legged walking robot
100 Main body
110 Control device
120 Initialization determination unit
130 Leg control unit
140 Initialization execution unit
141 Monitor unit
143 Offset determination unit
145 Offset control unit
200, 230 Leg
201 First link
203 Joint
205 Second link
210 Ground contact part
220 Main body mounting part
231 Exterior part
300 Non-contact guarantee space
310 Storage member
311 Storage hole

The invention claimed is:

1. A control device, comprising:
a processor configured to:
control at least one leg of a plurality of legs of a legged walking robot, wherein each leg of the plurality of legs includes a force sensor;
store the force sensor of each leg of the plurality of legs in a specific space surrounded by the plurality of legs, wherein the force sensor of each leg of the plurality of legs is in a non-contact state in the specific space;
measure an output signal of the force sensor in the non-contact state;
determine, based on the measured output signal, a first offset value for the measured output signal of the force sensor;
set, at the determined first offset value, a second offset value of the force sensor; and
initialize the force sensor based on the set second offset value.

2. The control device according to claim 1, wherein
the force sensor is at an end of each leg of the plurality of legs, and
the end of each leg of the plurality of legs is in contact with the ground.

3. The control device according to claim 2, wherein
the legged walking robot includes a main body and at least three legs of the plurality of legs that support the main body,
the specific space is at a side of a surface of the main body,
the surface of the main body faces the ground, and
the specific space is surrounded by the main body and the at least three legs.

4. The control device according to claim 3, wherein
each leg of the plurality of legs further includes at least one joint and a plurality of links, and
the processor is further configured to:
bend each leg of the plurality of legs at the at least one joint; and
store the force sensor in the specific space based on the bend of each leg of the plurality of legs at the at least one joint.

5. The control device according to claim 4, wherein
the surface of the main body includes a storage member,
the storage member includes a space inside, and
the processor is further configured to store the end of each leg of the plurality of legs in the space inside the storage member.

6. The control device according to claim 2, wherein
each leg of the plurality of legs further includes an exterior part that covers a side surface of each leg of the plurality of legs,
the exterior part is slidable along each leg of the plurality of legs, and
the processor is further configured to:
slide the exterior part to surround the force sensor; and
store the force sensor in the specific space inside the exterior part based on the slide of the exterior part.

7. The control device according to claim 1, wherein the processor is further configured to initialize the force sensor of each leg of the plurality of legs at a specific timing.

8. The control device according to claim 1, wherein the processor is further configured to:
detect abnormality in the force sensor; and
initialize the force sensor based on the detection of the abnormality.

9. The control device according to claim 8, wherein the processor is further configured to:
- detect the abnormality of the force sensor during a walk of the legged walking robot; and
- initialize the force sensor based on the abnormality detected during the walk of the legged walking robot.

10. The control device according to claim 1, wherein the processor is further configured to control a walk of the legged walking robot based on the output signal from the force sensor.

11. The control device according to claim 1, wherein the plurality of legs of the legged walking robot includes at least four legs.

12. A control method, comprising:
by a processor,
- controlling at least one leg of a plurality of legs of a legged walking robot, wherein each leg of the plurality of legs includes a force sensor;
- storing the force sensor of each leg of the plurality of legs in a specific space surrounded by the plurality of legs, wherein the force sensor of each leg of the plurality of legs is in a non-contact state in the specific space;
- measuring an output signal of the force sensor in the non-contact state;
- determining, based on the measured output signal, a first offset value for the measured output signal of the force sensor;
- setting, at the determined first offset value, a second offset value of the force sensor; and
- initializing the force sensor based on the set second offset value.

* * * * *